United States Patent
Kim (10) Patent No.: US 7,193,346 B2
(45) Date of Patent: Mar. 20, 2007

(54) MULTI-MODE VIBRATION GENERATOR FOR COMMUNICATION TERMINAL

(75) Inventor: Ju Ho Kim, Seoul (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 0 days.

(21) Appl. No.: 11/127,180

(22) Filed: May 12, 2005

(65) Prior Publication Data

US 2006/0066164 A1 Mar. 30, 2006

(30) Foreign Application Priority Data

Sep. 24, 2004 (KR) ................... 10-2004-0077410

(51) Int. Cl.
*H02K 7/06* (2006.01)
(52) U.S. Cl. ........................................ 310/81
(58) Field of Classification Search .............. 310/12, 310/15, 71, 81, 89
See application file for complete search history.

(56) References Cited

U.S. PATENT DOCUMENTS

| | | | | |
|---|---|---|---|---|
| 3,304,449 | A * | 2/1967 | Pohlman et al. | 310/103 |
| 4,748,851 | A | 6/1988 | Yoneda | |
| 4,774,440 | A * | 9/1988 | Bhadra | 310/81 |
| 6,486,579 | B1 * | 11/2002 | Furuya et al. | 310/81 |
| 6,504,278 | B1 * | 1/2003 | Bald et al. | 310/81 |
| 6,573,627 | B2 * | 6/2003 | Sun | 310/81 |
| 6,717,305 | B2 * | 4/2004 | Ruberl et al. | 310/81 |
| 2003/0034705 | A1 * | 2/2003 | Hakansson | 310/81 |
| 2003/0178902 | A1 | 9/2003 | An et al. | |
| 2004/0070294 | A1 * | 4/2004 | Hanada | 310/81 |
| 2005/0029880 | A1 * | 2/2005 | Noguchi | 310/81 |
| 2006/0028077 | A1 * | 2/2006 | Yamaguchi et al. | 310/81 |

FOREIGN PATENT DOCUMENTS

| | | |
|---|---|---|
| JP | 2003-117489 | 4/2003 |
| KR | 20-0316436 | 6/2003 |

* cited by examiner

*Primary Examiner*—Thanh Lam
(74) *Attorney, Agent, or Firm*—Lowe Hauptman & Berner (57) ABSTRACT

A multi-mode vibration generating device for a communication terminal includes a first vibration generator and one or more second vibration generators. The first vibration generator includes a first coil assembly and a first magnet and generating a vibration of a given direction by an interaction between an electric field generated by the first coil assembly and a magnet field generated by the first magnet. The one or more second vibration generators include a second coil assembly and a second magnet and generate a vibration of a given direction by an interaction between an electric field generated by the second coil assembly and an magnet field generated by the second magnet. The second vibration generator generates a vibration of a direction or frequency different from a vibration direction or frequency of the first vibration generator, whereby various mode vibrations are generated.

20 Claims, 12 Drawing Sheets

MULTI-MODE VIBRATION GENERATOR FOR COMMUNICATION TERMINAL

RELATED APPLICATION

The present application is based on, and claims priority from, Korean Application Number 2004-0077410, filed Sep. 24, 2004, the disclosure of which is hereby incorporated by reference herein in its entirety.

BACKGROUND OF THE INVENTION

1. Field of the Invention

The present invention relates to a device for generating various mode vibrations, and more particularly, to a device for generating various mode vibrations by stacking and modularizing two or more vibration generators whose vibration directions, amounts or frequencies are different from one another.

2. Description of the Related Art

In general, one of essential functions of a communication terminal is an incoming call notification function. For functions frequently used as this incoming call notification function, there are a function of generating sounds such as a melody or a bell and a function of vibrating the terminal.

Specifically, the vibrating function is mainly used in order not to cause harm to others owing to a melody or a bell generated from a speaker of the terminal. This vibration of the terminal can be usually generated through a driving force generated by a small-sized vibration motor of the terminal and then transmitted to the terminal's case.

In the meanwhile, the necessity for a multi-mode vibration generator has been recently increased for embodying multi-functions of the terminal, especially a multimedia function.

Rotation-type vibration motors currently adopted in the terminal are classified into a coin-type vibration motor of thin thickness and a bar-type vibration motor of long type, according to their shape.

Figure 1A:
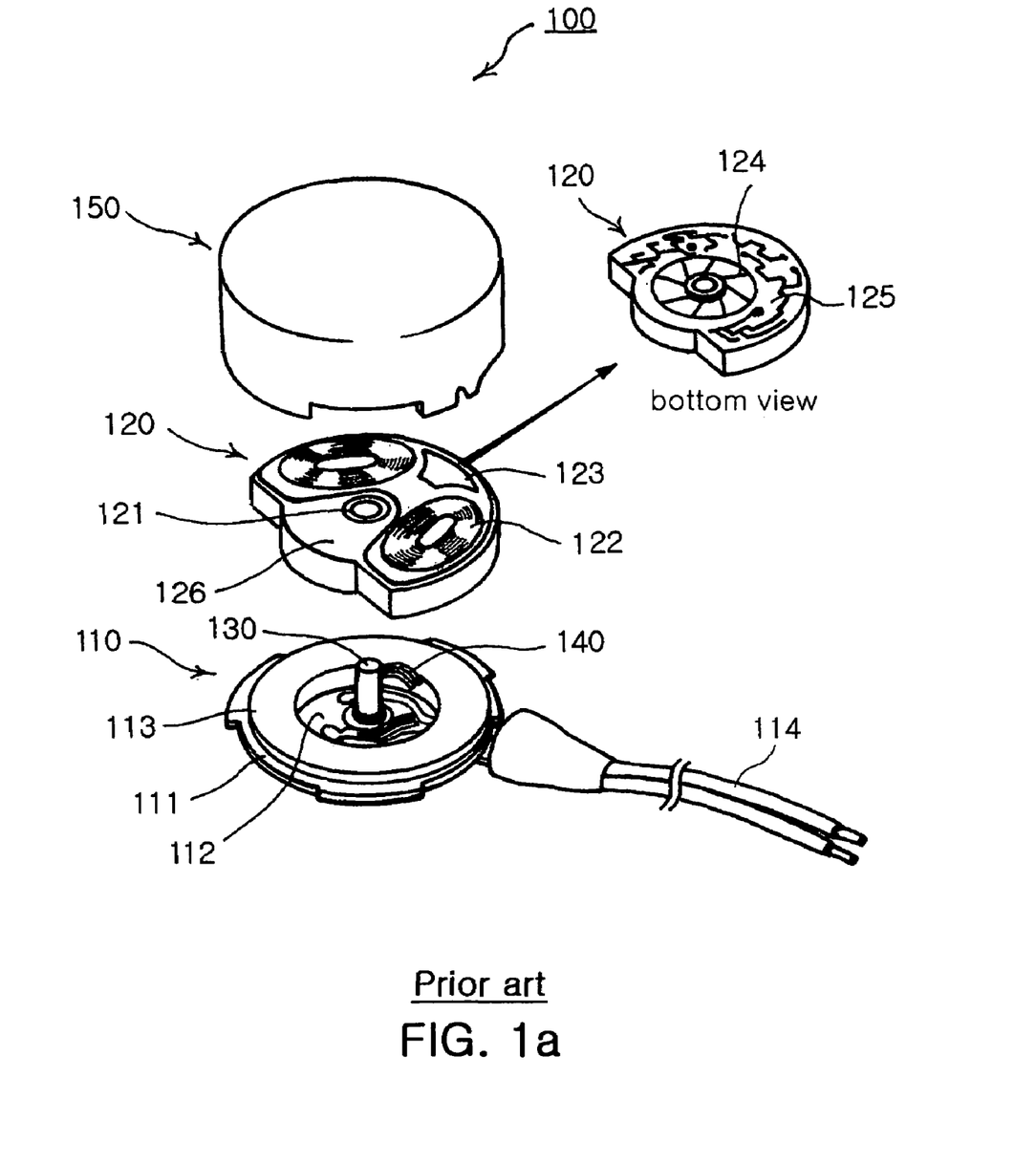
FIG. 1A is an exploded perspective view of a conventional coin-type vibration motor.
Figure 1B:
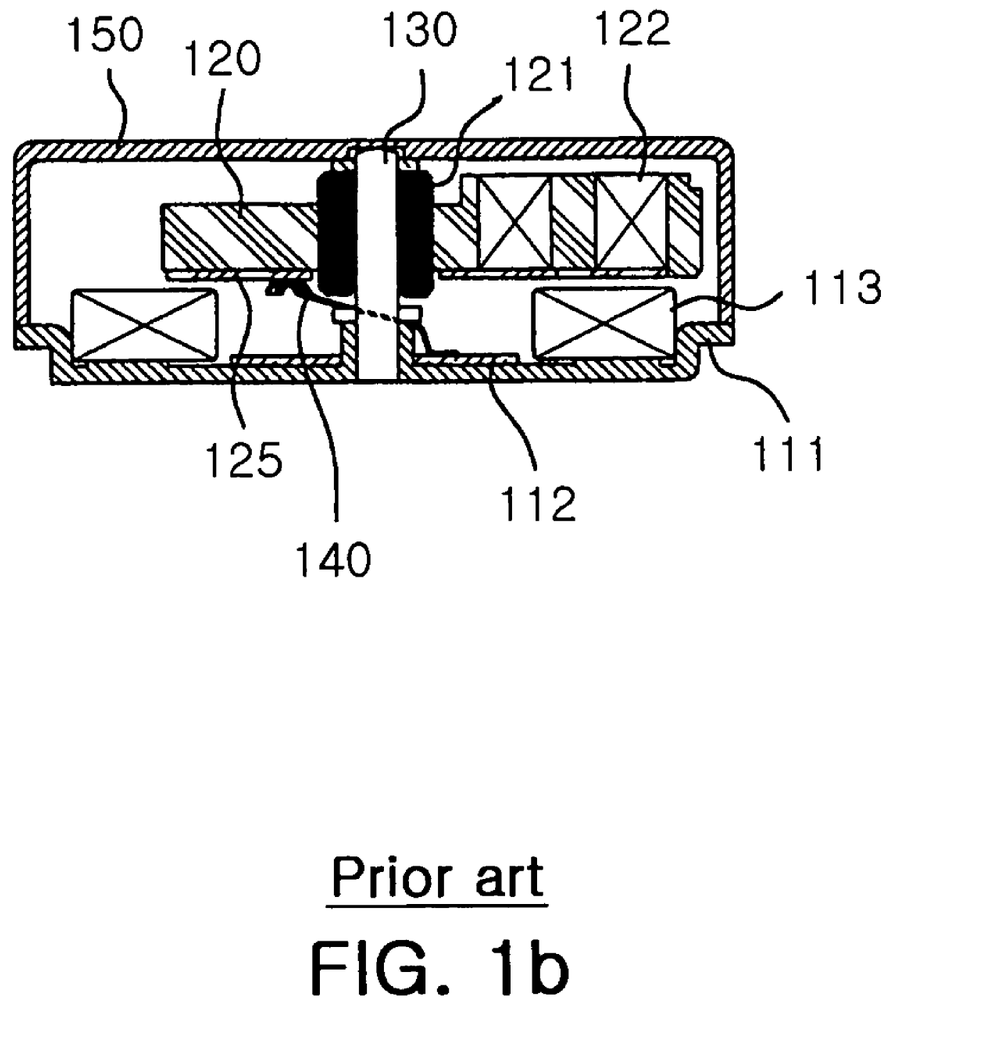
FIGS. 1B and 1C are a sectional view of a conventional coin-type vibration motor.
Figure 1C:
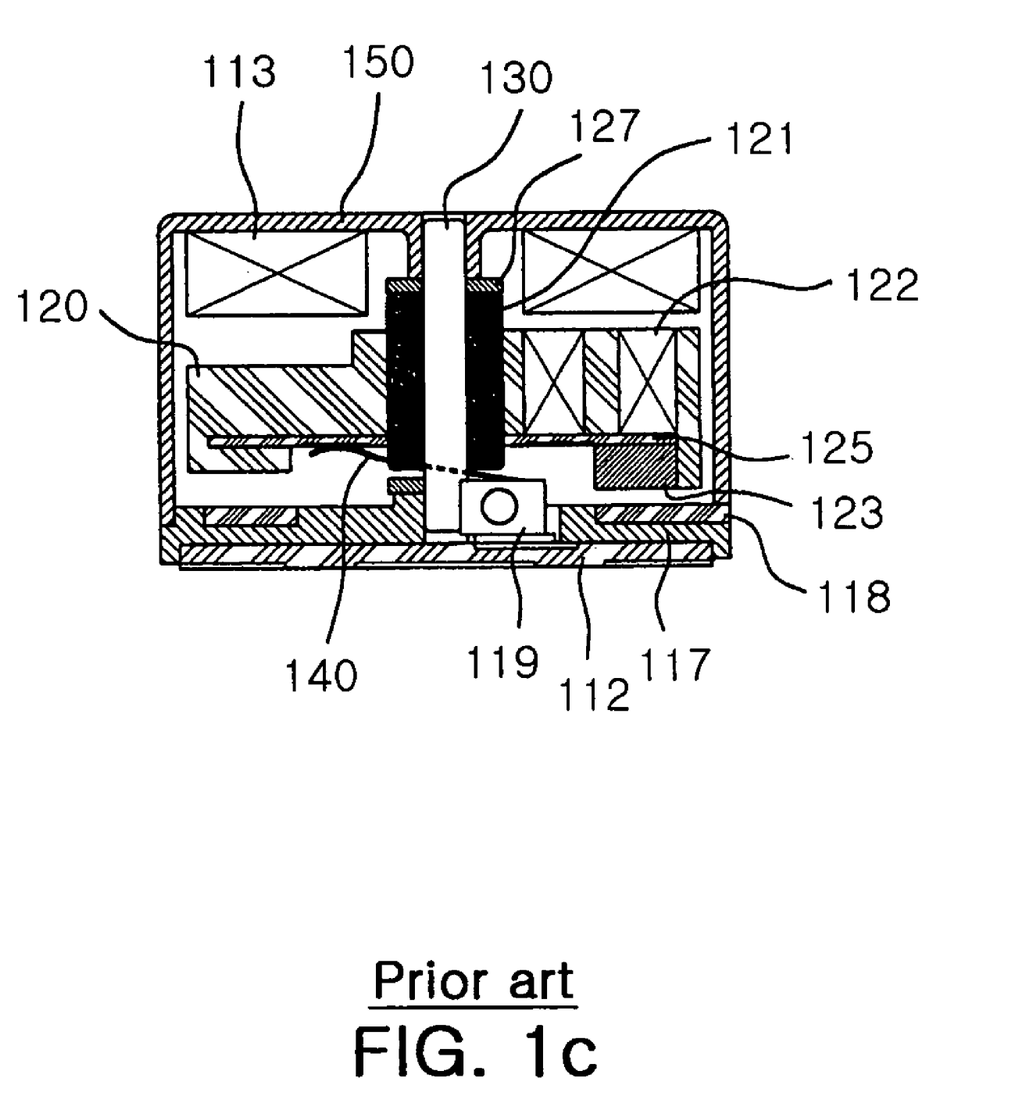

FIG. 1A is an exploded view of a conventional coin-type vibration motor, and FIGS. 1B and 1C is a sectional view of a conventional coin-type vibration motor. Reference will now be made to FIGS. 1A to 1C.

Referring to FIGS. 1A to 1C, a conventional coin-type vibration motor 100 includes a stator assembly 110 and a rotor assembly 120.

The stator assembly 110 is constructed to include a bracket 111 of a circular plate, a lower substrate 112 attached to the center of an upper surface of the bracket 111, and a ring-type magnet 113 attached around the lower substrate 112 and on the upper surface of the bracket 111.

The upper part of the bracket 111 is covered by a case 150, and the bracket 111 and the case are connected by a center shaft 130.

The rotor assembly 120 is rotatably connected to the shaft 130. The rotor assembly 120 includes a bearing 121, a coil assembly 122, a counter weight 123, a commutator 124, an upper substrate 125 and an insulator 126. Here, the rotor assembly 120 becomes eccentric by the counter weight 123.

Here, the lower parts of the stator assembly 110 and the rotor assembly 120 are fixed to the lower substrate 112. The upper parts of the stator assembly 110 and the rotor assembly 120 are electrically connected by a brush 140 configured to contact with the commutator 124.

The lower substrate 112 and an electric source are connected by a lead line 114 shown in FIG. 1A. Also, the lower substrate 112 and an electric source may be connected by a connector or an FPCB (flexible printed circuit board) connection port instead of the lead line 114.

In FIG. 1C, non-described reference numbers 117, 118, 119 and 127 respectively represent a mold part, a yoke, an auxiliary plate and a washer.

Reference will now be made to an operation of the conventional coin-type vibration motor 100.

Referring to FIG. 1A, an outer electric power is applied through the lead line 114, a current then flows through the brush 140 and the upper substrate 125 into the coil assembly 122 located in the eccentric rotor assembly 120. Thereafter, by an interaction of a field formed by the magnet 113 and the case 150, the eccentric rotor assembly 120 rotates around the shaft 130 with the bearing 121 intervening therebetween, thereby inducing a vibration.

Here, a vibration direction of the coin-type vibration motor 100 corresponds to a rotation plane of the rotor assembly 120, namely a plane perpendicular to the shaft 130.

Figure 2:
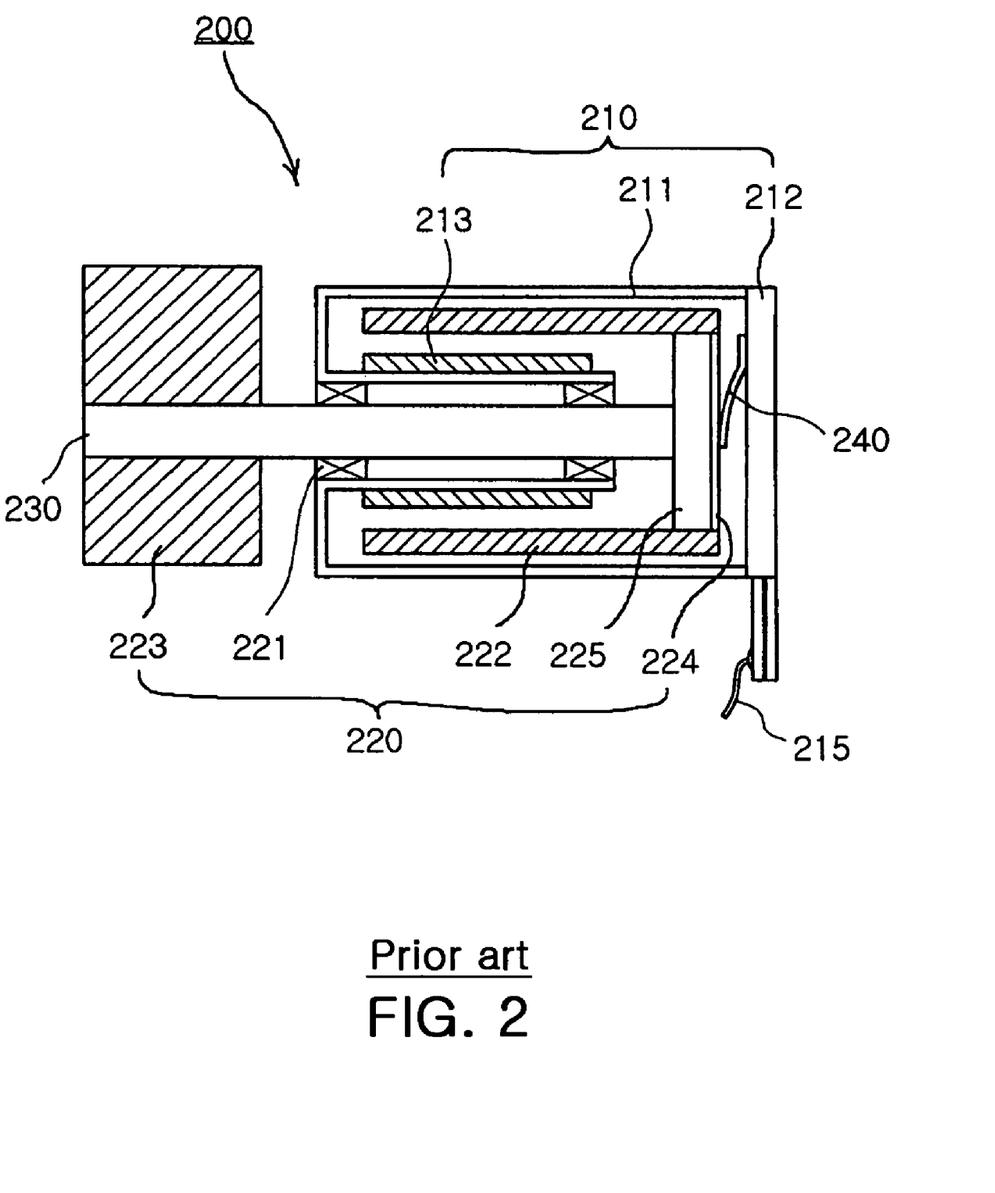
FIG. 2 is a sectional view of a conventional bar-type vibration motor.

FIG. 2 is a sectional view showing a side of a conventional bar-type vibration motor.

Referring to FIG. 2, a bar-type vibration motor 200 includes a stator assembly 210 and a rotor assembly 220.

The stator assembly 210 includes a body 211, a cap 212 fixed to a part of the body 211, and a magnet 213. The body 211 is hollow cylinder shaped, and the magnet 213 is fixed to an inside of the body 211.

The rotor assembly 220 includes an eccentric weight 223, a plurality of commutators 224 fixed to a side of a fixed frame 225 and spaced apart from one another, and a plurality of core assemblies 222 fixed to the fixed frame 225.

In the fixed cap 212, a pair of brushes 240 are attached to a fixed substrate (not shown). The brushes 240 are connected to a lead line 215 for supplying an electric power, and applies a current to the commutators 224.

Here, a vibration direction of the bar-type vibration motor 200 corresponds to a rotation plane of the rotor assembly 220.

Although the above-stated coin-type/bar-type vibration motors are somewhat different from each other in their shape, both the motors are similar in that they obtains a mechanical vibration by rotating a rotator assembly having unbalanced mass and generates a rotation force by applying a current to a rotor coil through a contact point between a brush and a commutator.

However, in case of a rotation-type vibration motor which generates a vibration by rotating an eccentric rotator assembly as stated above, since an eccentric amount, an eccentric mass and a driving rpm (revolutions per minute) are predetermined during the motor design stage, whereby a vibration amount (i.e. a vibration force) is fixed, the size of a vibration generated by the motor is constant.

That is, since a vibration force (F) is proportional to mass of a vibrating body (m), an eccentric amount (e), the square of a driving rpm ($\omega^2$) as shown in the following Equation (1) and their values are predetermined during the motor design stage, only a vibration of constant amount is generated by the motor.

$$F \propto m \times e \times \omega^2 \qquad \text{(Equation 1)}$$

Also, a vibration direction of the coin-type or the bar-type vibration motor is confined to a rotation plane of a rotor assembly, whereby only a vibration of single shape is generated. Therefore, the coin-type or the bar-type vibration motor cannot be adopted in a multimedia-functioned communication terminal that requires various patterned vibrations to be generated. Besides, in case of the coin-type or the bar-type vibration motor, users cannot freely select the amounts of a vibration.

Figure 3:
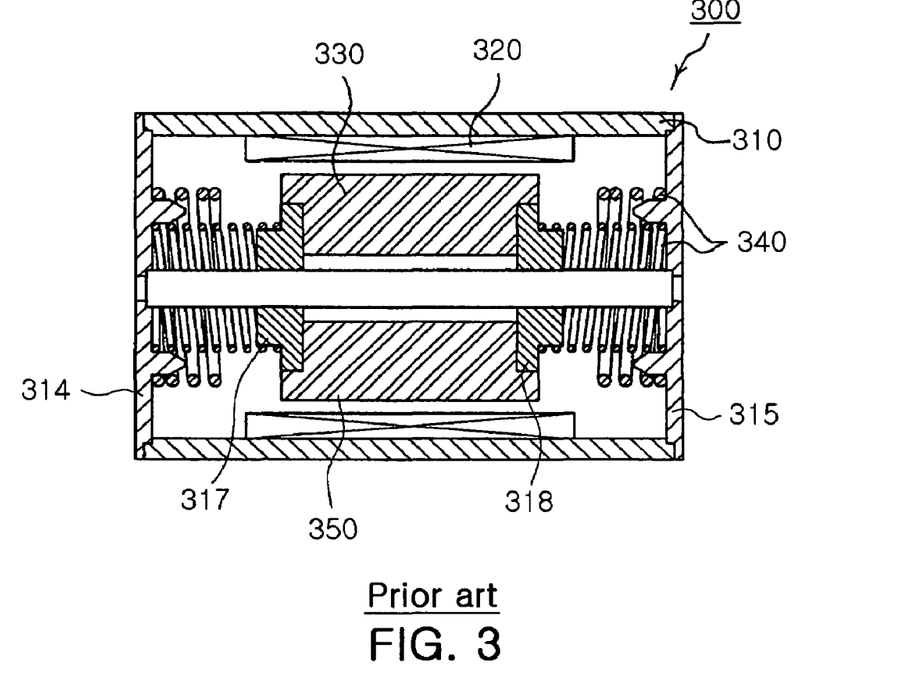
FIG. 3 is a sectional view of a conventional horizontal direction linear vibrator generating a horizontally linear vibration.

FIG. 3 illustrates a conventional horizontal direction linear vibrator generating a horizontally linear vibration. Reference will now be made to a structure and operation of a conventional linear vibrator 300.

Referring to FIG. 3, a pair of brackets 314 and 315 are attached to axial outer ends of a cylinder-shaped frame 310 and supports both ends of a fixed axis. A cylinder-shaped coil 320 having a power input port is attached on an inner peripheral surface of the cylinder-shaped frame 310.

A moving part 350 includes a cylinder-shaped and radially-magnetized magnet 330, bearings 317 and 318 connected to axial ends of the magnet 330, and an elastic part 340 placed between the bearings 317 and 318 and the brackets 314 and 315.

Figure 4:
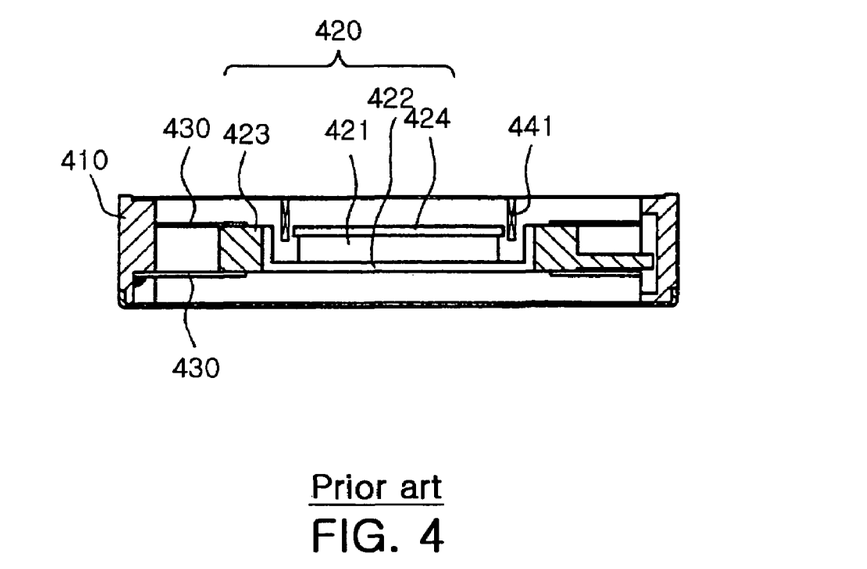
FIG. 4 is a sectional view of a conventional vertical direction linear vibrator generating a vertically linear vibration.

FIG. 4 is a sectional view of a conventional vertical direction linear vibrator generating a vertically linear vibration. Reference will now be made to a structure and operation of a conventional vertical direction linear vibrator 400.

In the vertical direction linear vibrator 400 shown in FIG. 4, by an interaction between a magnetic force generated from a magnet and an electromagnetic force of a given frequency generated form a coil assembly, a moving part resonates vertically, thereby inducing a vertical vibration. The vertical direction linear vibrator 400 includes a case 410, a moving part 420 and a coil assembly 441.

The moving part 420 includes a magnet 421, a yoke 422 surrounding the magnet 421, a mass body 423 of a given mass attached to both sides of the yoke 422, and a plate 424.

The coil assembly 441 is placed to an upper side of the moving part 420, and generates an electromagnetic force of a given frequency.

An elastic part 430 is connected to the moving part 420 and induces a vibration when a frequency is applied.

In this type of the vertical direction linear vibrator 400, the coil assembly 441 may be attached to a lower part. In this case, a flexible printed circuit may be placed to a lower side of the coil assembly 441 so that the flexible circuit is connected to an input port.

In the linear vibrator shown in the FIGS. 3 and 4, by an interaction between a magnetic force generated from the magnet 330 or 421 and an electromagnetic force of a given frequency generated form the coil assembly 320 or 441, the moving part 350 or 420 resonates horizontally or vertically, thereby inducing a horizontal or vertical vibration.

In the linear vibrator using a resonant frequency, a vibration force (F) is proportional to mass of a vibrating body (M), displacement of the vibrating body (X), the square of a resonant frequency ($f^2$) as shown in the following Equation (2).

$$F \propto M \times X \times f^2 \quad \text{(Equation 2)}$$

However, this linear vibrator also cannot generate various vibrations other than a vibration of predetermined direction. In addition, although the linear vibrator can adjust its vibration amount by changing a resonant frequency according to an applied voltage, it can basically generate only a vibration of a given amount predetermined during its design stage.

Therefore, a vibration generator capable of generating various vibrations has been required in the related art.

In addition, the necessity for a modularized vibration generator, which can be reflow attached without changing its attachment area and the number of assembling processes and can generate various mode vibrations in respect of a vibration direction, a vibration frequency and/or a vibration amount, has be recently increased.

SUMMARY OF THE INVENTION

Accordingly, the present invention has been devised to solve the aforementioned problems.

An object of the present invention is to provide a multi-mode vibration generator for a communication terminal, which generates various mode vibrations in respect of a vibration direction, a vibration frequency and/or a vibration amount.

Another object of the present invention is to provide a multi-mode vibration generator for a communication terminal, which can be modularized so that its installation area is small and its assemblability is excellent.

Further another object of the present invention is to provide a multi-mode vibration generator for a communication terminal, which includes a PCB (printed circuit board) for reflow attachment and transmits a vibration by the PCB, thereby enabling minimization of an attachment area and modularlization.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a multi-mode vibration generating device for a communication terminal includes a first vibration generator and one or more second vibration generators. The first vibration generator includes a first coil assembly generating an electric field by an electric power source applied by a first power applying means, and a first magnet generating a magnetic field of a constant strength, and thereby generating a vibration of a given direction by an interaction between the electric field generated by the first coil assembly and the magnet field generated by the first magnet. The one or more second vibration generators include a second coil assembly vertically and sequentially attached to an upper part of the first vibration generator and generate an electric field by an electric power source applied by each of a second power applying means, and a second magnet generating a magnetic field of a constant strength, and thereby generating a vibration of a given direction by an interaction between the electric field generated by the second coil assembly and the magnet field generated by the second magnet, wherein the second vibration generator generates a vibration of a direction different from a vibration direction of the first vibration generator, or generates a vibration of a frequency different from a vibration frequency of the first vibration generator, whereby various mode vibrations are generated.

Preferably, the multi-mode vibration generating device further includes a PCB (printed circuit board) for connecting the first power applying means and each of the second power applying means with an outer electric power source.

More preferably, the PCB is configured to function as a bottom plate of a first housing receiving the first coil assembly and the first magnet, and upper patterns connected with the first power applying means and each of the second power applying means are formed on an upper surface of the PCB, and lower patterns are formed on a lower surface of the PCB so as to connect the upper patterns with the outer electric power source, and the upper patterns and the lower patterns are connected with a circuit by connection holes formed to penetrate the PCB.

Preferably, the first vibration generator includes a linear vibrator in which a moving part generates a linear vibration by an interaction between the electric field generated by the first coil assembly and the magnet field generated by the first magnet, or a coin-type vibration motor rotating an eccentric rotor assembly and thereby generating a vibration on a rotation plane of the rotor assembly, and each of the second vibration generators generates a vibration of a direction or frequency different from a vibration direction or frequency of the first vibration generator and another of the second vibration generators.

Here, each of the second vibration generators comprises a linear vibrator generating a linear vibration by resonance of a moving part, or a coin-type vibration motor rotating an eccentric rotor assembly and thereby generating a vibration on a rotation plane of the rotor assembly.

Preferably, the linear vibrator linearly resonates on a line in a plane parallel to the PCB or on a line perpendicular to the PCB, and generates vibrations of different frequencies according to a predetermined natural frequency.

Also preferably, the coin-type vibration motor generates vibrations of different frequencies or amounts according to a driving rpm (revolutions per minute) of an eccentric rotor assembly, an eccentric amount or an eccentric mass.

Preferably, the multi-mode vibration generating device further includes a frame covering and fixing the first vibration generator and the second vibration generator, or a controller independently controlling a generation of vibrations by the first vibration generator and each of the second vibration generators.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 5A:
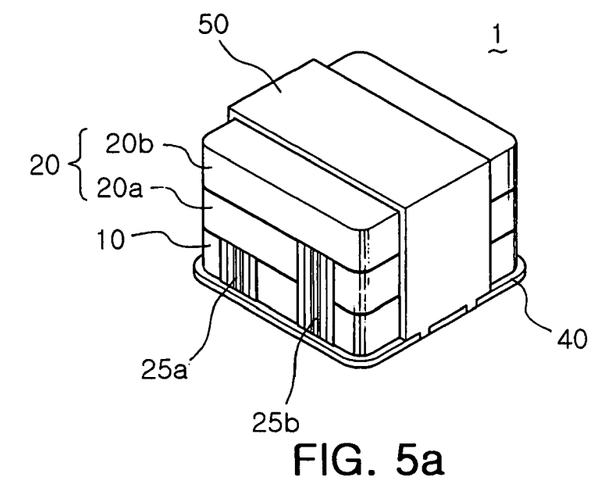
FIGS. 5A to 5C are a perspective view of a multi-mode vibration generator according to an embodiment of the present invention.
Figure 5B:
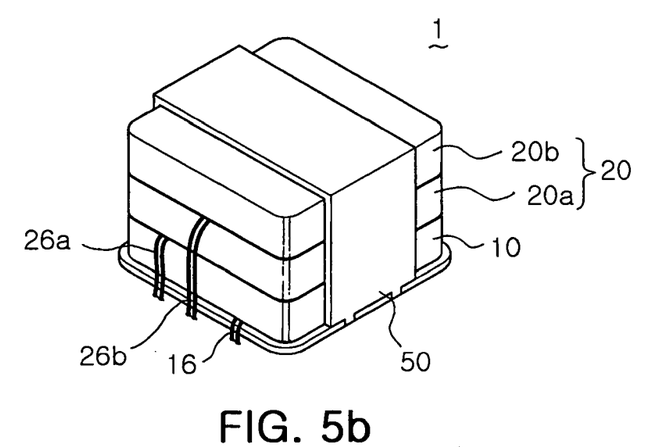
Figure 5C:
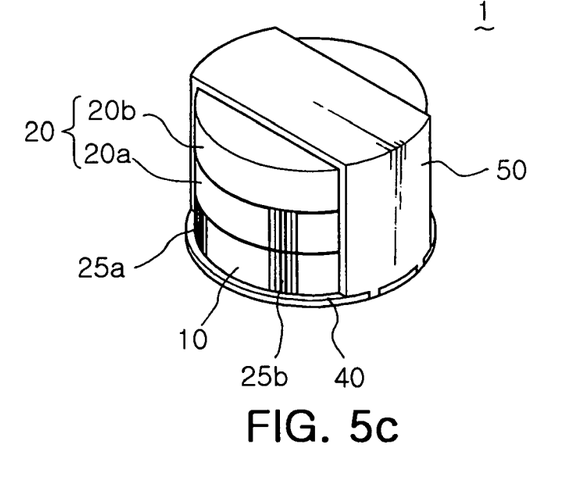
Figure 6:
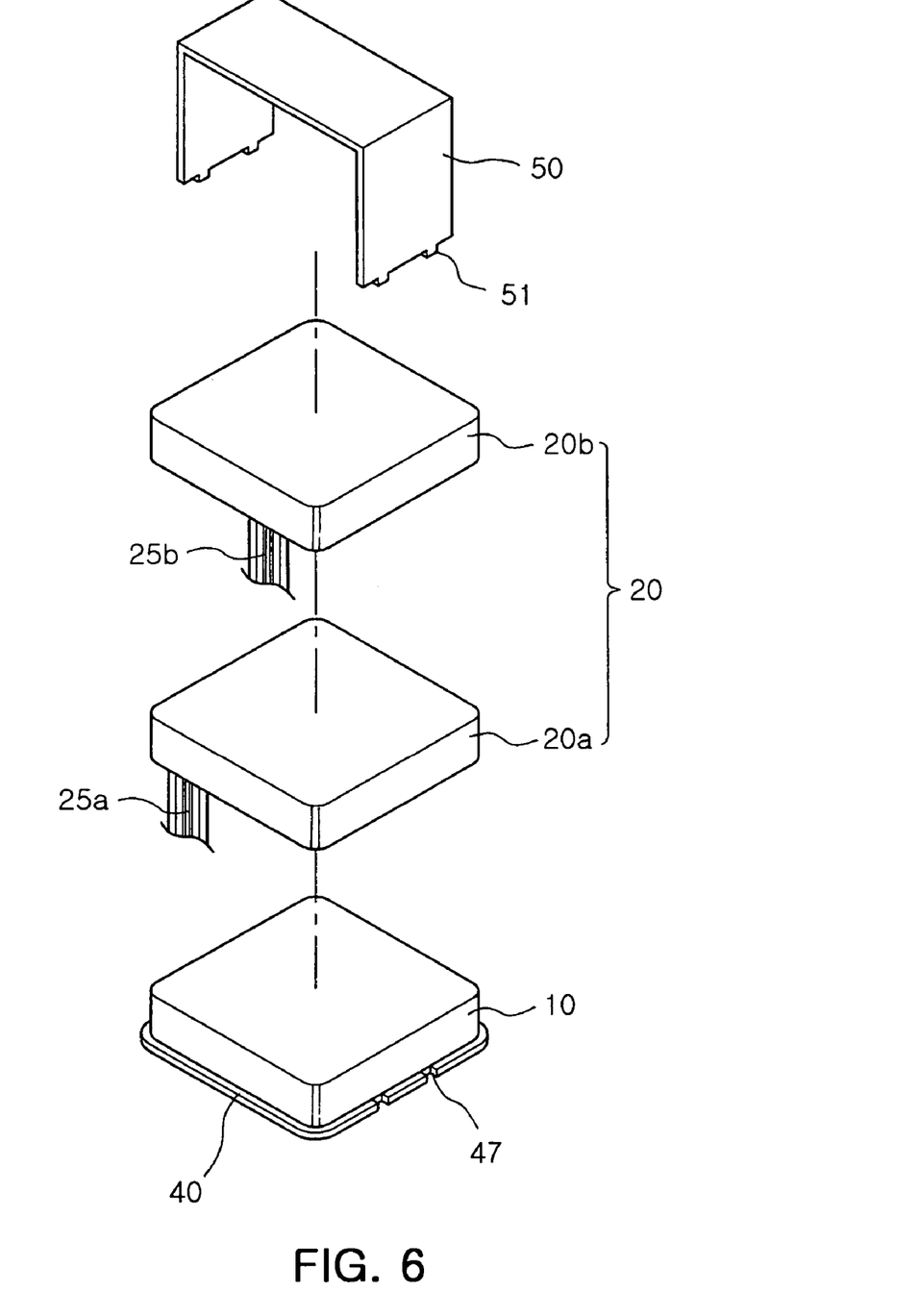
FIG. 6 is an exploded perspective view of a multi-mode vibration generator according to an embodiment of the present invention.
Figure 7:
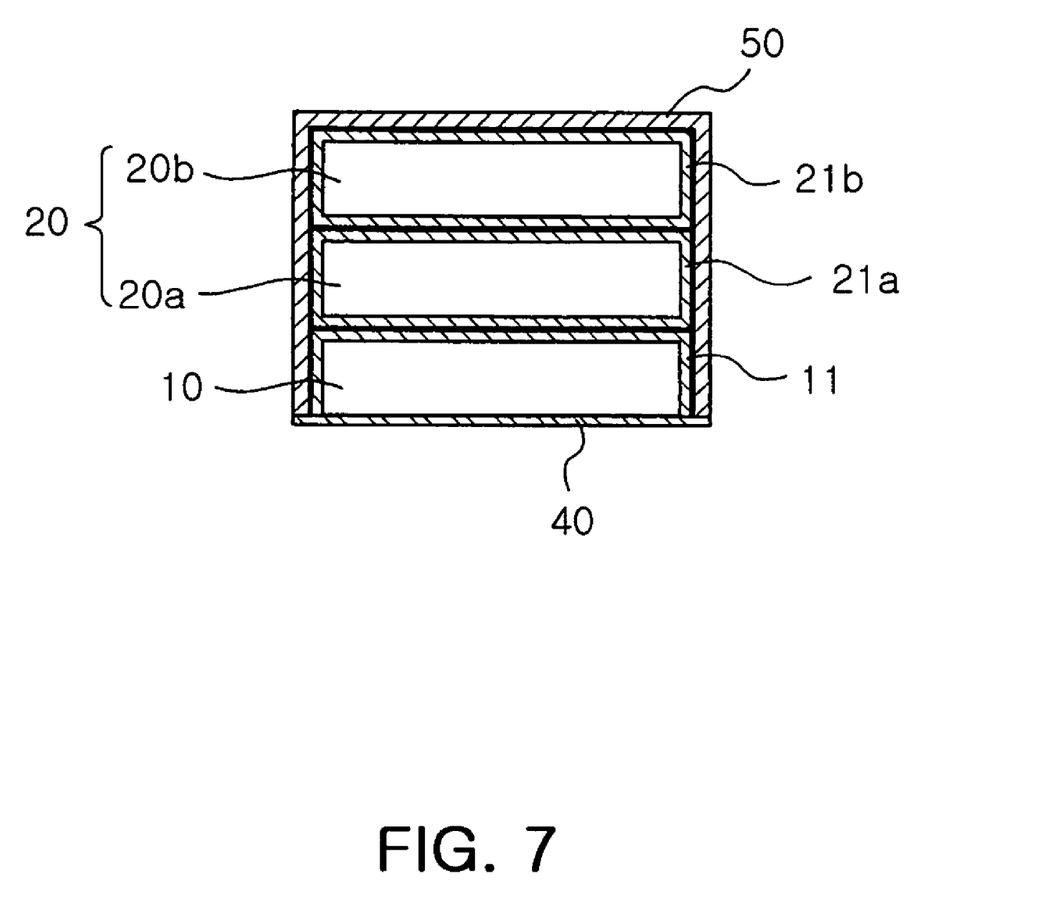
FIG. 7 is a sectional view of a multi-mode vibration generator according to an embodiment of the present invention.
Figure 8A:
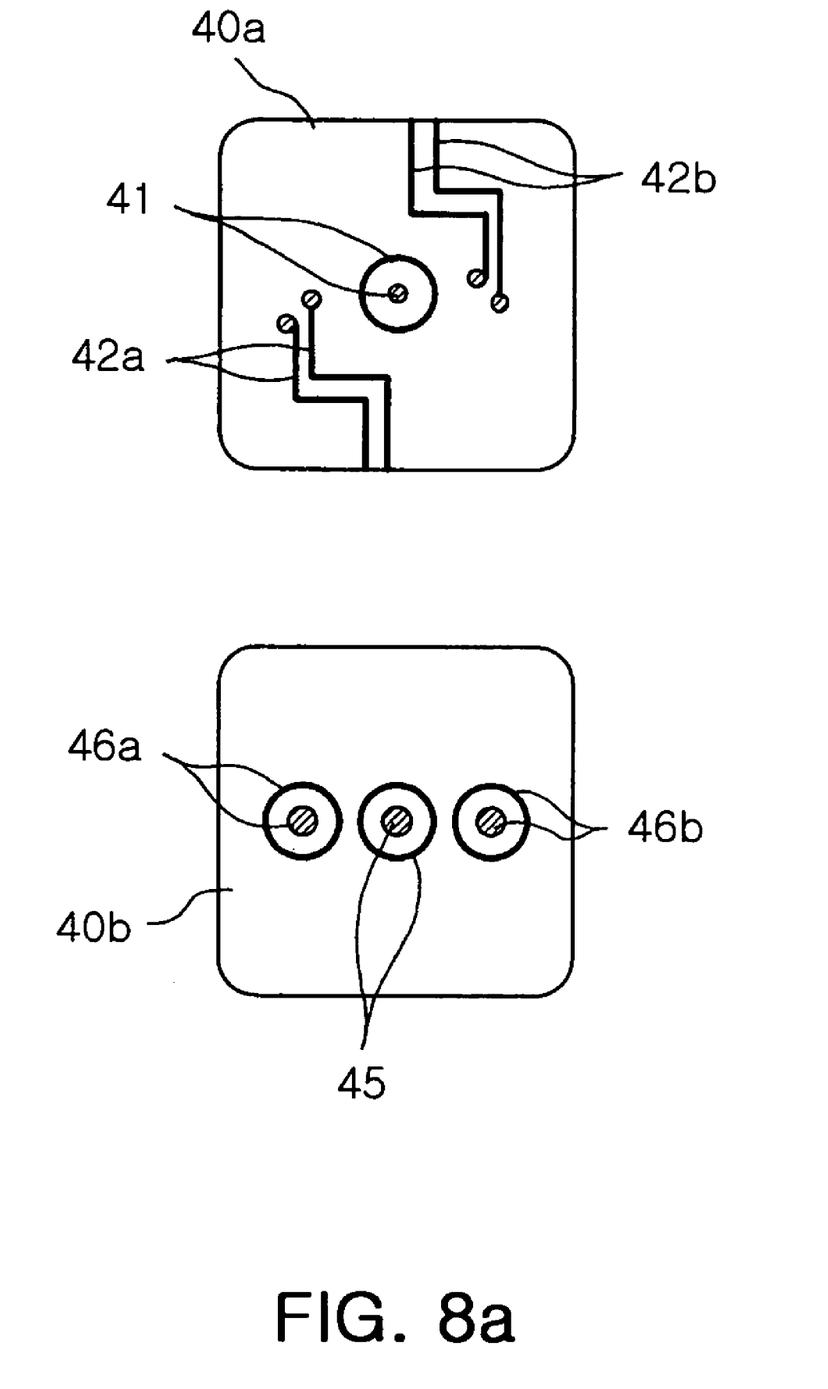
FIGS. 8A to 8C are a plan view illustrating patterns of upper and lower parts of a PCB according to an embodiment of the present invention.
Figure 8B:
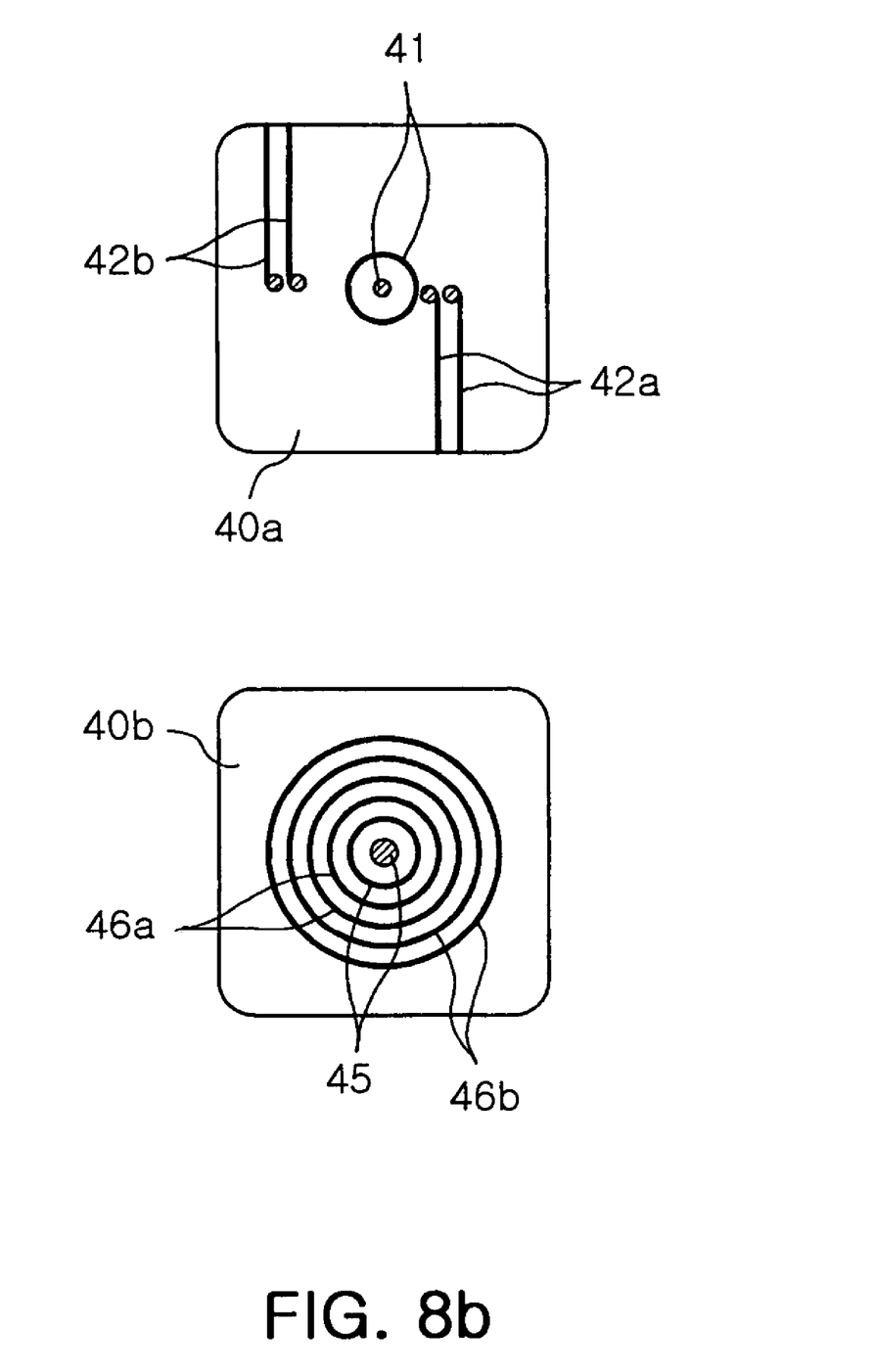
Figure 8C:
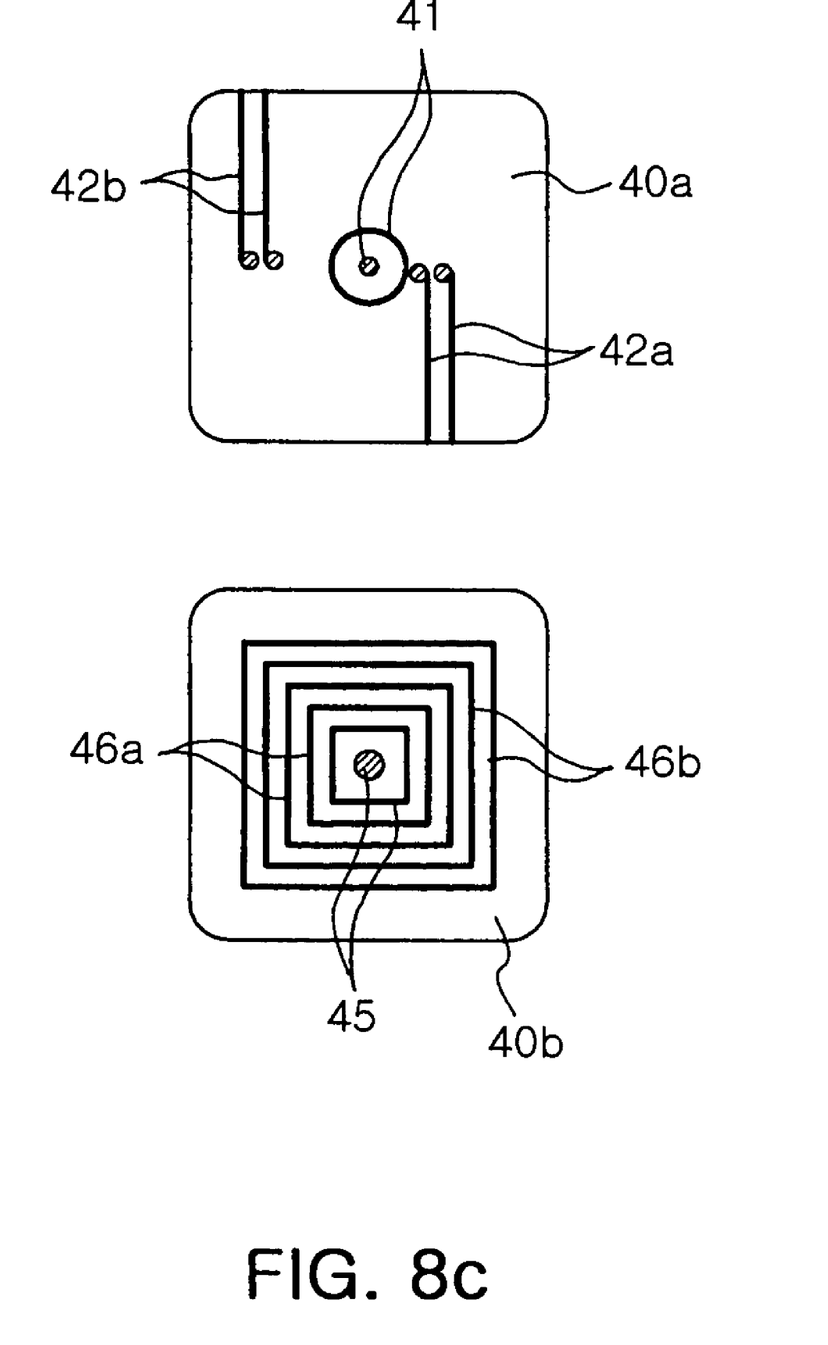

FIGS. 5A to 5C is a perspective view of a multi-mode vibration generator according to an embodiment of the present invention. FIG. 6 is an exploded perspective view of a multi-mode vibration generator according to an embodiment of the present invention. FIG. 7 is a sectional view of a multi-mode vibration generator according to an embodiment of the present invention. FIG. 8 is a plan view illustrating patterns of upper and lower parts of a PCB according to an embodiment of the present invention.

As shown in FIGS. 5A to 5C, the multi-mode vibration generator 1 according to the present invention includes a first vibration generator 10 and one or more second vibration generators 20.

As the first vibration generator 10 and each of the second vibration generators 20, a coin-type vibration motor 100 and a horizontal direction linear vibrator 300 and a vertical direction linear vibrator 400 shown in FIGS. 1, 3 and 4 are respectively used.

The first vibration generator 10 includes a first power applying means, a first coil assembly and a first magnet. Each of the second vibration generators 10 is vertically fixed to an upper part of the first vibration generator 10, and includes a second power applying means, a second coil assembly and a second magnet.

Here, the first power applying means can be embodied not only by the lead lines 114 and 215 shown in FIGS. 1 and 2, but also by FPCB connection ports 25A and 25B shown in FIGS. 5A and 5B.

The first coil assembly and the second coil assembly correspond to the coil assemblies 122, 222, 320 and 441 shown in FIGS. 1 to 4. Hereinafter, the first coil assembly and the second coil assembly will be expressed as C1 and C2, respectively.

Also, the first magnet and the second magnet correspond to the magnets 113, 213, 330 and 421 shown in FIGS. 1 to 4. Hereinafter, the first magnet and the second magnet will be expressed as M1 and M2, respectively.

That is, as shown in FIGS. 5A to 5C, the first vibration generator 10 includes the first coil assembly C1 forming an electric field by electric power applied by the first power applying means (not shown), and the first magnet M1 forming a magnetic field of given strength. The first vibration generator 10 generates a vibration in a given direction by an interaction between the electric field formed by the first coil assembly C1 and the magnet field formed by the first magnet M1. The first vibration generator 10 is embodied through the coin-type vibration motor 100, the horizontal direction linear vibrator 300 or the vertical direction linear vibrator 400.

Similarly, each of the second vibration generators 20A and 20B includes the second coil assembly C2 forming an electric field by electric power applied by the second power applying means 25A, 25B, 26A and 26B, and the second magnet M2 forming a magnetic field of given strength. Each of the second vibration generators 20A and 20B generates a vibration in a given direction by an interaction between the electric field formed by the second coil assembly C2 and the magnet field formed by the second magnet M2. Each of the second vibration generators 20A and 20B is embodied through the coin-type vibration motor 100, the horizontal direction linear vibrator 300 or the vertical direction linear vibrator 400.

Here, one of the second vibration generators 20A and 20B generates a vibration having a direction different from vibration directions of the first vibration generator 10 and another of the second vibration generators 20A and 20B, or generates a vibration having a frequency different from vibration frequencies of the first vibration generator 10 and another of the second vibration generators 20A and 20B.

Also, the second vibration generator 20A is fixed to an upper part of the first vibration generator 10 by bonding or welding, and the second vibration generator 20B is fixed to an upper part of the second vibration generator 20A by bonding or welding.

Preferably, the first vibration generator 10 can be embodied through a linear vibrator that makes a moving part resonate in a linear direction by an interaction between an electric field formed by the first coil assembly C1 and a magnet field formed by the first magnet M1, thereby generating a linear vibration.

Here, the linear vibrator is embodied through the horizontal direction linear vibrator 300 or the vertical direction linear vibrator 400 shown in FIGS. 3 and 4, and the moving part 350 and 420 (hereinafter, referred to as V) shown in FIGS. 3 and 4 resonates by an interaction between an electric field and a magnetic field, thereby generating a vibration.

Also, the first vibration generator 10 can be embodied through a coin-type vibration motor that rotates an eccentric rotor assembly by an interaction between an electric field formed by the first coil assembly C1 and a magnet field formed by the first magnet M1, thereby generating a vibration on a rotation plane of the rotor assembly.

Here, the coin-type vibration motor is embodied through the coin-type vibration motor 100 shown in FIGS. 1A to 1C, and the rotor assembly 120 (hereinafter, referred to as R) shown in FIGS. 1A to 1C eccentrically rotates, thereby generating a vibration.

In the meanwhile, in case where the first vibration generator 10 is embodied through the linear vibrator 300 and 400 or the coin-type vibration motor 100, one of the second vibration generators 20A and 20B generates a vibration of some direction or amount different from a vibration direction or amount of the first vibration generator 10 and another of the second vibration generators 20A and 20B. Here, each of the second vibration generators 20A and 20B is embodied through the linear vibrators 300 and 400 generating a linear vibration by a resonation of the moving part V, or by the coin-type vibration motor 100 generating a vibration on a rotation plane of an eccentric rotor assembly R by rotating the rotor assembly R.

Here, in order that the first and second vibration generators 10 and 20 vibrate in different directions, the first vibration generator 10 and each of the second vibration generators 20A and 20B can be embodied by a combination of the linear vibrators 300 and 400, or by a combination of the linear vibrators 300 and 400 and the coin-type vibration motor 100.

That is, since the linear vibrators 300 and 400 linearly vibrates on a line in a plane parallel to a PCB 40 (in case of a horizontal direction linear vibrator) or on a line in a plane perpendicular to the PCB 40 (in case of a vertical direction linear vibrator), the linear vibrators 300 and 400 can be placed at proper positions so that a vibration of a desired direction is generated. Alternatively, each of the first and second vibration generators 10 and 20 can be constructed by a combination of a combination of the linear vibrators 300 and 400 and the coin-type vibration motor 100 so that a vibration is generated on a plane horizontal with the PCB 40.

In the meanwhile, the first and second vibration generators 10 and 20 can be constructed to generate vibrations of different frequencies.

That is, since each of the linear vibrators 300 and 400, to which a frequency corresponding to its natural frequency is applied so as to maximize a vibration amount, generates a vibration of a frequency identical or similar to its natural frequency, and since the coin-type motor 100 generates vibrations of different amounts according to a driving rpm of an eccentric rotor assembly R, it is possible to make a vibration generator having two or more vibration frequencies by a combination of the linear vibrators 300 and 400 having different vibration frequencies and the coin-type vibration motor 100.

Needless to say, in case where the linear vibrators 300 and 400 having different vibration frequencies and the coin-type vibration motor 100 are combined, it is possible to make the multi-mode vibration generator 1 having different vibration directions as well as different vibration frequency.

For example, all of the first vibration generator 10 and the second vibration generators 20A and 20B can be constructed by the linear vibrators 300, 300 and 400 whose vibration directions are respectively X, Y and Z directions, wherein vibration frequencies of the linear vibrators 300, 300 and 400 can be identical to or different from one another. Here, an X and y axis direction vibration can be obtained by orthogonally arranging two linear vibrators 300.

Also, the first vibration generator 10 can be constructed by a Z axis direction (namely vertical direction) linear vibrator 400 with the second vibration generator being constructed by the coin-type vibration motor 100, whereby the multi-mode vibration can be constructed by only two vibration generators. Further, the horizontal direction linear vibrator 300 can be additionally attached as another second vibration generator.

Besides, various combination multi-mode vibration generators 1 can be constructed, whereby a vibration generating device having various modes in respect of a vibration direction, frequency and amount can be constructed.

The multi-mode vibration generator according to the present invention may additionally include a PCB 40.

The PCB 40 connects a first power applying means (not shown) and each of the second power applying means 25A, 25B, 26A and 26B with an outer power source.

Here, a power applying means such as a lead line or an FPCB connection port is connected to the PCB 40 by welding or connector, and the PCB 40 is attached to a main PCB of a communication terminal (not shown) or connected with an outer power source by another power connection means.

Preferably, as shown in FIG. 7, the PCB 40 is configured to function as a bottom plate of a first housing 11 receiving the first coil assembly C1 and the first magnet M1. That is, the PCB 40 functions as a base of the multi-mode vibration generator 1.

Here, as shown in FIG. 8A, upper patterns 41, 42A and 42B connected with the first power applying means (not shown) and each of the second power applying means 25A and 25B are formed on an upper surface 40A of the PCB 40, and lower patterns 45, 46A and 46B are formed on a lower surface 40B of the PCB 40 so as to connect the upper patterns 41, 42A and 42B with an outer power source. Here, the upper patterns 41, 42A and 42B and the lower patterns 45, 46A and 46B are respectively connected with a circuit through connection holes (not shown) configured to penetrate the PCB 40.

That is, the first power applying means of the first vibration generator is connected with the upper pattern 41 placed at the center of the PCB 40, and the upper pattern 41 is connected with the lower pattern 45 by a connection hole.

Similarly, the second power applying means 25A and 25B are respectively connected with the upper patterns 42A and 42B of the PCB 40, and the upper patterns 42A and 42B are respectively connected with the lower patterns 46A and 46B by connection holes.

More preferably, as shown in FIGS. 8B and 8C, in order that the PCB 40 can be reflow attached to a main PCB (not shown) of a communication terminal, the lower patterns 45, 46A and 46B are constructed by a plurality of concentric circles or a plurality of concentric squares formed spaced apart from one another at a given interval in the manner of corresponding to the upper patterns 41, 42A and 42B.

Here, the shapes of the upper and lower patterns are not limited to those shown in FIG. 8. For example, the upper patterns can be constructed to be connected with a power applying means in one direction, and the lower patterns may be constructed to have any structure that enables a reflow attachment and has not directionality, thereby facilitating automation.

For this reflow attachment structure, the PCB 40 should function as a bottom plate of the first housing 11 of the first vibration generator 10 and perform a power applying function. Accordingly, it is preferable that the first vibration generator 10 be the linear vibrator 300 and 400. However, if the lower substrate 112, namely a PCB can be attached to a bottom plate of a housing as shown in FIG. 1C, the coin-type vibration motor 100 also can be adopted as the first vibration generator 10.

In the meanwhile, as shown in FIGS. 5 to 7, the multi-mode vibration generator 1 can further include a frame 50 surrounding the first vibration generator 10 and the second vibration generator 20A and 20B.

Preferably, the frame 50 strongly fixes the vibration generators 10, 20A and 20B and the PCB40, prevents the vibration generators from being separated while a vibration is generated, and are fixed in such a way that protrusion parts 51 of the frame 50 are joined with concave parts 47 of the PCB 40 as shown in FIG. 6.

Also preferably, the frame 50 is generally U-shaped, covers both sides of the first vibration generator 10 and the second vibration generators 20A and 20B and an upper surface of the second vibration generator 20B, and end parts of the frame 50 is fixed to side edges of the PCB 40.

Here, the shape of the frame 50 can be changed to accord with the shape of the vibration generators 10, 20A and 20B. In addition, the frame 50 not only fixes the vibration generator 10, 20A and 20B but also effectively transmits a vibration of the second vibration generator to a communication terminal.

Figure 9:
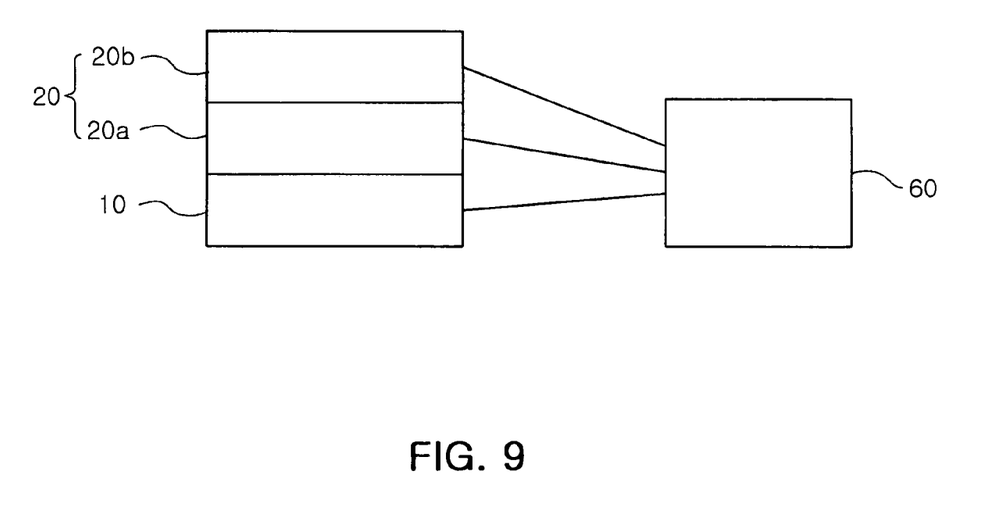
FIG. 9 is a schematic diagram illustrating a controller according to an embodiment of the present invention.

FIG. 9 is a schematic diagram illustrating a controller according to an embodiment of the present invention.

As shown in FIG. 9, the multi-mode vibration generator 1 can further include a controller 60 for separately controlling generation of vibrations by the first vibration generator 10 and the second vibration generators 20A 20B.

The controller 60 not only can separately drive each of the first vibration generator 10 and the second vibration generators 20A and 20B, but also can simultaneously drive two or more of the vibration generators, thereby making it possible to generate various vibrations whose vibration directions or frequencies are different from one another.

Also, in case where the vibration generators are embodied through the linear vibrator 300 and 400, the controller 60 can adjust the strength of an electric field and the resulting vibration amount by adjusting a voltage applied to each of the vibration generators, and also can control a vibration-maintained time by adjusting a connected/disconnected time of an electric power applied to the vibration generators 10, 20A and 20B.

That is, by using this type of controller 60, the vibration generators 10, 20A and 20B can be separately or complexly driven, thereby making it possible to generate more various mode vibrations in respect of a vibration direction, frequency and amount.

Further, the multi-mode vibration generator 1 can also adjust a strength and/or length of vibrations, thereby making it possible to generate not only vibrations satisfying users' desires but also various mode vibrations useful for a multimedia function such as a game function.

As described previously, the multi-mode vibration generator according to the present invention can generate various mode vibrations in respect of a vibration direction, frequency and amount, thereby making it possible to generate not only vibrations satisfying users' desires but also various mode vibrations useful for a multimedia function such as a game function.

Also, the multi-mode vibration generator can be modularized by a PCB for reflow attachment, whereby its installation area is small and its assemblability is excellent.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A multi-mode vibration generating device for a communication terminal, comprising:
 a first vibration generator including a first coil assembly generating an electric field by an electric current applied by a first power applying arrangement, and a first magnet generating a magnetic field of a constant strength, and thereby generating a vibration of a given direction by an interaction between the electric field generated by the first coil assembly and the magnet field generated by the first magnet; and
 one or more second vibration generators including a second coil assembly vertically and sequentially attached to an upper part of the first vibration generator and generating an electric field by an electric current applied by of a second power applying arrangement, and a second magnet generating a magnetic field of a constant strength, and thereby generating a vibration of a given direction by an interaction between the electric field generated by the second coil assembly and the magnet field generated by the second magnet,
 wherein the second vibration generator generates a vibration of a direction different from a vibration direction of the first vibration generator, or generates a vibration of a frequency different from a vibration frequency of the first vibration generator, whereby various mode vibrations are generated.

2. The device of claim 1, further comprising a PCB (printed circuit board) for connecting the first power applying arrangement and the second power applying arrangement with an electric current.

3. The device of claim 2, wherein the PCB is configured to function as a bottom plate of a first housing receiving the first coil assembly and the first magnet, and upper patterns connected with the first power applying arrangement and each of the second power applying arrangement are formed on an upper surface of the PCB, and lower patterns are formed on a lower surface of the PCB so as to connect the upper patterns with the electric current, wherein the upper patterns and the lower patterns are connected with a circuit by connection holes formed to penetrate the PCB.

4. The device of claim 3, wherein the lower patterns comprise a plurality of concentric circles or a plurality of concentric squares formed spaced apart from one another at a given interval in the manner of corresponding to the upper patterns.

5. The device of claim 1, wherein the first vibration generator comprises a linear vibrator in which a moving part generates a linear vibration by an interaction between the electric field generated by the first coil assembly and the magnet field generated by the first magnet, and each of the second vibration generators generates a vibration of a direction or frequency different from a vibration direction or frequency of the first vibration generator and another of the second vibration generators.

6. The device of claim 1, wherein the first vibration generator comprises a coin-type vibration motor rotating an eccentric rotor assembly by an interaction between the electric field generated by the first coil assembly and the magnet field generated by the first magnet and thereby generating a vibration on a rotation plane of the rotor assembly, and each of the second vibration generators generates a vibration of a direction or frequency different from a vibration direction or frequency of the first vibration generator and another of the second vibration generators.

7. The device of claim 5, wherein each of the second vibration generators comprises a linear vibrator generating a linear vibration by resonance of a moving part.

8. The device of claim 6, wherein each of the second vibration generators comprises a linear vibrator generating a linear vibration by resonance of a moving part.

9. The device of claim 5, wherein each of the second vibration generators comprises a coin-type vibration motor rotating an eccentric rotor assembly and thereby generating a vibration on a rotation plane of the rotor assembly.

10. The device of claim 6, wherein each of the second vibration generators comprises a coin-type vibration motor rotating an eccentric rotor assembly and thereby generating a vibration on a rotation plane of the rotor assembly.

11. The device of claim 7, wherein the linear vibrator linearly resonates on a line in a plane parallel to the PCB or on a line perpendicular to the PCB.

12. The device of claim 8, wherein the linear vibrator linearly resonates on a line in a plane parallel to the PCB or on a line perpendicular to the PCB.

13. The device of claim 9, wherein the coin-type vibration motor generates vibrations of different frequencies or amounts according to a driving rpm (revolutions per minute) of an eccentric rotor assembly, an eccentric amount or an eccentric mass.

14. The device of claim 10, wherein the coin-type vibration motor generates vibrations of different frequencies or amounts according to a driving rpm (revolutions per minute) of an eccentric rotor assembly, an eccentric amount or an eccentric mass.

15. The device of claim 1, further comprising a frame covering and fixing the first vibration generator and the second vibration generator.

16. The device of claim 15, wherein the frame is generally U-shaped and covers both sides of the first vibration generator and the second vibration generator and an upper surface of the uppermost second vibration generator, and end parts of the frame are fixed to side edges of the PCB.

17. The device of claim 1, further comprising a controller independently controlling a generation of vibrations by the first vibration generator and each of the second vibration generators.

18. The device of claim 17, wherein the controller simultaneously drives two or more of the first vibration generator and the second vibration generators, thereby generating various vibrations whose vibration directions or frequencies are different from one another.

19. The device of claim 17, wherein if the linear vibrator is used as the vibration generator, the controller adjusts a strength of an electric field and the resulting vibration amount by adjusting a voltage of an applied electric current.

20. The device of claim 17, wherein the controller controls a vibration-maintained time by adjusting a connected/disconnected time of an applied electric current.

* * * * *